United States Patent
Shi (10) Patent No.: US 11,252,767 B2
(45) Date of Patent: Feb. 15, 2022

(54) METHOD FOR ALLOCATING IDENTIFIER OF DATA BEARER, AND NETWORK NODE AND COMPUTER STORAGE MEDIUM

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/921,363

(22) Filed: Jul. 6, 2020

(65) Prior Publication Data
US 2020/0337098 A1 Oct. 22, 2020

Related U.S. Application Data

(63) Continuation of application No. PCT/CN2018/071521, filed on Jan. 5, 2018.

(51) Int. Cl.
*H04W 76/10* (2018.01)
*H04W 76/11* (2018.01)
*H04W 76/20* (2018.01)

(52) U.S. Cl.
CPC .......... *H04W 76/11* (2018.02); *H04W 76/20* (2018.02)

(58) Field of Classification Search
CPC . H04W 76/11; H04W 76/20; H04W 36/0069; H04W 76/15; H04W 36/28; H04W 36/0027; H04W 92/20; H04W 76/16; H04B 7/18539; H04B 17/382
See application file for complete search history.

(56) References Cited

U.S. PATENT DOCUMENTS

| | | | | |
|---|---|---|---|---|
| 2014/0112194 A1* | 4/2014 | Novlan | ............. | H04W 8/005 370/254 |
| 2015/0139153 A1* | 5/2015 | Zhang | ............. | H04W 4/70 370/329 |
| 2015/0163822 A1* | 6/2015 | Guo | ............. | H04W 72/121 370/329 |

(Continued)

FOREIGN PATENT DOCUMENTS

| | | |
|---|---|---|
| CN | 104219722 A | 12/2014 |
| CN | 104813713 A | 7/2015 |

(Continued)

OTHER PUBLICATIONS

Huawei et al: "DRB ID management for security in dual connectivity", 3GPP Draft; R2-141158, 3rd Generation Partnership Project (3GPP), Mobile Competence Centre; 650, Route Des Lucioles; F-06921 Sophia-Antipolis Cedex; France, vol. Ran WG2, No. Valencia, Spain Mar. 31, 2014-Apr. 4, 2014, (Mar. 22, 2014), XP050817746, * section 2.2 *.

(Continued)

*Primary Examiner* — Andrew Wendell
(74) *Attorney, Agent, or Firm* — Perkins Coie LLP (57) ABSTRACT

Provided are a data radio bearer (DRB) identifier (ID) allocation method, a network node, and a computer storage medium. The method includes: when a first network node modifies a DRB, selecting ID information of the DRB within a stored DRB ID range, or, acquiring ID information of the DRB from a second network node.

16 Claims, 4 Drawing Sheets

An addition request of the first network node is received from a second netwoik node, and a DRB ID range of a fist network node is acquired from the addition request of the first network node — 101

When the fist network node modifies a DRB, DRB ID information is selected within a stored DRB ID range, or, DRB ID information is acquired from the second netwok node — 102

(56) References Cited

U.S. PATENT DOCUMENTS

| | | | | |
|---|---|---|---|---|
| 2018/0317103 | A1* | 11/2018 | Luo | H04W 92/20 |
| 2019/0029057 | A1* | 1/2019 | Pan | H04W 28/0268 |
| 2019/0104439 | A1* | 4/2019 | Shi | H04W 28/08 |
| 2020/0015116 | A1* | 1/2020 | Huang | H04W 28/10 |
| 2020/0067689 | A1* | 2/2020 | Wang | H04L 5/0096 |
| 2020/0120535 | A1 | 4/2020 | Dai et al. | |

FOREIGN PATENT DOCUMENTS

| | | |
|---|---|---|
| CN | 105813091 A | 7/2016 |
| CN | 105813098 A | 7/2016 |
| CN | 106993339 A | 7/2017 |
| EP | 3641477 A1 | 4/2020 |
| JP | 2020523911 A | 8/2020 |
| RU | 2622110 C2 | 6/2017 |
| WO | 2018228166 A1 | 12/2018 |
| WO | 2019104536 A1 | 6/2019 |

OTHER PUBLICATIONS

ZTE: "Further Discussion and pCR on Qos Flow to DRB Mapping in MR-DC@5GC", 3GPP Draft; R3-174305 Further Discussion and PCR on QOS Flow To DRB Mapping in MR-DC@5GC V2, (3GPP), Mobile Competence Centre; 650, Route Des Lucioles; F-06921 Sop, vol. RAN WG3, No. Reno, USA; Dec. 1, 2017, (Nov. 17, 2017), XP051373033, * section 2 *.

Supplementary European Search Report in the European application No. 18898548.5, dated Nov. 27, 2020.

First Office Action of the Russian application No. 2020125875, dated Feb. 12, 2021.

International Search Report in the international application No. PCT/CN2018/071521, dated Sep. 12, 2018.

Huawei et al. "R2-1712390, DRB level offloading in NR DC" 3GPP TSG RAN WG2 #100, http://www.3gpp.org/Meetings_3GPP_SYNC/RAN2/Docs/R2-1712390 DRB level offloading in NR DC.doc, Nov. 17, 2017, pp. 2-4.

Samsung, "R2-1707208, Summary of Email Discussion [98#26][NR] SN/MN Information Exchange" 3GPP TSG RAN NG2 NR Ad Hoc, http://www.3gpp.org/ftp/tsg_ran/WG2 RL2/TSGR2_AHs/2017_06_NR/Docs/, Jun. 21, 2017. p. 1.

Huawei, HiSilicon, offline discussion 7—QoS support in NR DC, Discussion and Decision, 3GPP TSG-RAN WG2 NR Adhoc#2 R2-1707493, Jun. 27-29, 2017 (Jun. 27-29, 2017).

Written Opinion of the International Search Authority in the international application No. PCT/CN2018/071521, dated Sep. 12, 2018.

Architecture and solutions of 5G ultra dense network; Zhang Jianmin et al, Telecommunications Science, Dec. 31, 2016; Section 1-5 of the text. 16 pages.

3GPP TSG RAN WG3 Meeting #93 R3-161813, Göteborg, Sweden, Aug. 22-26, 2016, Agenda item: 10.5.3, Source: CMCC, Title: Transport requirement for CU&DU functional splits options, Document for: discussion. 7 pages.

3GPP TR 38 801 V14 0.0 (Mar. 2017), 3rd Generation Partnership Project; Technical Specification Group Radio Access Network; Study on new radio access technology: Radio access architecture and interfaces, (Release 14). 91 pages.

Dual Connectivity in LTE HetNets with Split Control- and User-Plane, Anna Zakrzewska et al, Globecom 2013 Workshop-Broadband Wireless Access, Dec. 31, 2013. pp. 391-396.

3GPP TSG RAN WG2 #99 R2-1708931, Berlin, Germany, Aug. 21-25, 2017, Agenda item: 10.2.13, Source Huawei, HiSilicon, Title: DRB level offloading in NR DC, Document for: Discussion and decision. 4 pages.

First Office Action of the Chinese application No. 202010815004.0, dated Aug. 31, 2021. 11 pages with English translation.

First Office Action of the European application No. 18898548.5, dated Jul. 20, 2021. 8 pages.

First Office Action of the Korean application No. 10-2020-7022543, dated Sep. 15, 2021. 8 pages with English translation.

First Office Action of the Canadian application No. 3087600, dated Jul. 26, 2021. 4 pages.

First Office Action of the Japanese application No. 2020-536954, dated Nov. 12, 2021. 10 pages with English translation.

Office Action of the Indian application No. 202017033331, dated Dec. 8, 2021. 8 pages with English translation.

3GPP TSG RAN WG2 #99bis R2-1710223 (Revision of R2-1708931), Prauge, Czech, Oct. 9-13, 2017; Agenda item: 10.2.16; Source: Huawei, HiSilicon; Title: DRB level offloading in NR DC. 4 pages.

Second Office Action of the Chinese application No. 202010815004.0, dated Dec. 2, 2021. 10 pages with English translation.

* cited by examiner

FIG. 4 ent of International Patent
METHOD FOR ALLOCATING IDENTIFIER OF DATA BEARER, AND NETWORK NODE AND COMPUTER STORAGE MEDIUM

CROSS-REFERENCE TO RELATED APPLICATION

This application is a continuation of International Patent Application No. PCT/CN2018/071521, filed on Jan. 5, 2018, the content of which is incorporated herein by reference in its entirety.

TECHNICAL FIELD

The disclosure relates to the technical field of information processing, and more particularly, to a method for allocating an identifier of a data radio bearer (DRB), a network node, and a computer storage medium.

BACKGROUND

In a long term evolution (LTE) dual connectivity (DC) scenario, when a bearer context is needed to be modified, established or released by a bearer of a secondary node (SN), an SeNB Modification process needs to be initiated. The SeNB modification process may be initiated by a master node (MN) or a SN. However, when the SN on a network side is independently responsible for establishment, modification and release of the DRB of the SN, there may be a problem that IDs of different DRBs on a user equipment (UE) side are mixed up because the DRB ID usage of the MN is not known.

SUMMARY

In order to solve the above technical problems, embodiments of the disclosure provide a DRB ID allocation method, a network node, and a computer storage medium.

An embodiment of the disclosure provides a DRB ID allocation method. The method may include:
receiving a DRB ID range available to the first network node from a second network node.

An embodiment of the disclosure provides a DRB ID allocation method. The method may include:
sending, to a first network node, a DRB ID range available to the first network node.

An embodiment of the disclosure provides a first network node. The first network node may include: a processor, a memory configured to store instructions executable by the processor, and a network interface connected to the processor and the memory and configured to perform communication under control of the processor. The network interface is configured to receive a DRB ID range available to the first network node from a second network node.

An embodiment of the disclosure provides a second network node. The second network node may include a processor, a memory configured to store instructions executable by the processor, and a network interface connected to the processor and the memory and configured to perform communication under control of the processor. The network interface is configured to send, to a first network node, a Data Radio Bearer (DRB) Identifier (ID) range available to the first network node.

DETAILED DESCRIPTION

In order to understand the features and technical contents of the embodiments of the disclosure in more detail, the implementation of the embodiments of the disclosure will be described in detail with reference to the accompanying drawings. The attached drawings are for reference only and are not intended to limit the embodiments of the disclosure.

Embodiment 1

An embodiment of the disclosure provides a DRB ID allocation method. The method includes that:
when DRB modification is performed by a first network node, DRB ID information is selected within a stored DRB ID range, or, DRB ID information is acquired from a second network node.

The first network node described in the embodiment may be an SN on a network side.

The embodiment may include the following two processing modes.

Figure 1:
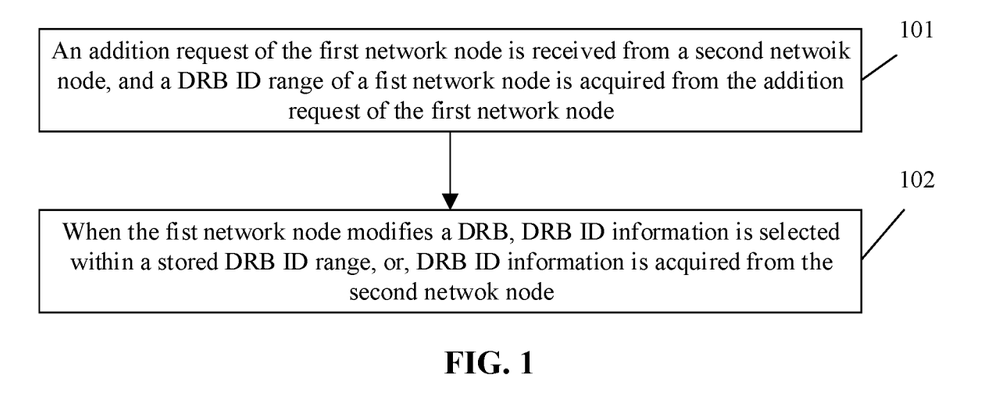
FIG. 1 is a flowchart of a DRB ID allocation method according to an embodiment of the disclosure.

As shown in FIG. 1, mode 1 includes the following steps.

In step 101, an addition request of the first network node is received from a second network node, and a DRB ID range of a first network node is acquired from the addition request of the first network node.

In step 102, when the first network node modifies a DRB, DRB ID information is selected within a stored DRB ID range, or, DRB ID information is acquired from the second network node.

The step that an addition request of the first network node is received from a second network node may include that: the addition request of the first network node is received from the second network node through an Xn interface.

Specifically, for example, the first network node may be an SN, and the second network node may be an MN.

When the SN is added by the MN, an DRB ID range available to the SN may be carried in a request message of adding the SN. The SN may be informed that when a DRB is added, only the IDs within the DRB ID range can be allocated to the added DRB.

The request message of adding the SN may be an Xn message initiated and transmitted by the MN to the SN through an Xn interface.

The DRB ID range of the SN may be configured to represent a minimum ID available to the SN. That is, the DRB ID range may indicate a minimum ID that can be used. For example, a total range is [0, 31]; if the DRB ID range included in the request message is 15, then DRB IDs available to the SN may be [15, 31].

It should be understood that although not indicated, the DRB ID range may also be a maximum value available to the SN. For example, a total range is [0, 31]; if the DRB ID range is 15, it means that available DRB IDs of the SN may be [0, 15].

There may be other configuration modes. The embodiments will not list all of them.

The DRB addition of the SN may be initiated by the MN or may be initiated by the SN.

When the second network node initiates modification of the first network node, a modification request may be received from the second network node through an Xn interface, DRB ID information may be selected within the DRB ID range based on the modification request, the selected DRB ID information may be used as an added DRB, and the added DRB may be sent to the second network node through an acknowledgment message. In other words, if SN modification may be initiated by the MN, the MN may send an SN modification request to the SN through Xn, and the SN may send the added DRB information (including type, ID, etc.) to the MN through an acknowledgment message.

When the first network node initiates a modification process, DRB ID information may be selected within the DRB ID range, the selected DRB ID information may be sent to UE through a Radio Resource Control (RRC) reconfiguration message, or, the selected DRB ID information may be sent to UE through the second network node. In other words, in a case that the SN modification process is initiated by the SN, the SN may directly send the added DRB information in the RRC reconfiguration message to the UE, or may send the added DRB information to the UE through the MN.

Mode 2 differs from mode 1 in that the mode 2 does not require the DRB ID range to be acquired from the MN in advance. A DRB ID may be acquired or directly added only when DRB modification is required.

When the SN executes the SN modification process (for example, when a DRB is added), an available DRB ID may be requested from the MN through an Xn request message. The MN may return an acknowledgment message through Xn. The SN may establish a DRB based on the message returned by the MN.

Specifically, for example, the first network node may be an SN, and the second network node may be an MN. The SN modification process may be initiated by the MN or may be initiated by the SN.

When the second network node initiates modification of the first network node, a modification request may be received from the second network node through an Xn interface, DRB ID information may be acquired from the modification request, a DRB may be established based on the DRB ID information, and an establishment success message may be fed back to the second network node. In other words, in a case that the SN modification process is initiated by the MN, the MN may send an SN modification request to the SN through Xn, the request message carrying DRB ID information. The SN may establish a DRB according to the DRB ID information, and then feed back an establishment success message to the MN through Xn.

When the first network node initiates a modification process, a request message may be sent to the second network node, a feedback message may be received from the second network node in response to the request message, DRB ID information may be acquired from the feedback message, and a DRB may be established based on the DRB ID information. In a case that the SN modification process is initiated by the SN, the SN may first send a request message to the MN, the MN may send an available DRB ID to the SN through a feedback message, and the SN may establish a DRB according to the available DRB ID in the feedback message.

By adopting the above solution, when a DRB is modified on a network side, a DRB ID can be selected within a stored DRB ID range, or a DRB ID can be acquired from a second network node. Thus, the second network node and a first network node can be coordinated to obtain final allocated DRB ID information, so as to avoid same DRB ID information from being allocated by both the first network node and the second network node when the first network node modifies the DRB independently, thereby avoiding mixing up DRB ID information.

Embodiment 2

An embodiment of the disclosure provides a DRB ID allocation method. The method includes the following steps.

A DRB ID range of a first network node or DRB ID information used by the first network node is sent to the first network node.

In the present embodiment, for example, a second network node may be an MN on a network side.

The embodiment may include the following two processing modes.

In mode 1, a DRB ID range of the first network node is added to an addition request of the first network node, and the addition request of the first network node is sent to the first network node.

Further, when the first network node modifies a DRB, DRB ID information may be selected within a stored DRB ID range, or, DRB ID information may be acquired from the second network node.

Specifically, for example, the first network node may be an SN, and the second network node may be an MN.

When the SN is added by the MN, a DRB ID range available to the SN may be carried in a request message of adding the SN. The SN may be informed of that when a DRB is added, only IDs within the DRB ID range can be allocated to the added DRB.

The request message of adding the SN may be an Xn message initiated and transmitted by the MN to the SN through an Xn interface.

The DRB ID range of the SN may be configured to represent a minimum ID available to the SN. That is, the DRB ID range may indicate a minimum ID that can be used. For example, a total range is [0, 31]; if the DRB ID range included in the request message is 15, available DRB IDs of the SN may be [15, 31].

It should be understood that although not indicated, the DRB ID range may also indicate an available maximum value of the SN. For example, a total range is [0, 31]; if the DRB ID range is 15, it means that available DRB IDs of the SN is [0, 15].

There may also be other configuration modes. The embodiment will not list all of them.

The DRB addition of the SN may be initiated by the MN or may be initiated by the SN.

When the MN initiates modification of the SN, a modification request may be received from the MN through an Xn interface, DRB ID information may be selected within the DRB ID range based on the modification request, the selected DRB ID information may be used as an added DRB, and the added DRB may be sent to the MN through an acknowledgment message. In other words, in a case that an SN modification process is initiated by the MN, the MN may send an SN modification request to the SN through Xn, and the SN may send the added DRB information (including type, ID, etc.) to the MN through an acknowledgment message.

When the SN initiates a modification process, DRB ID information may be selected within the DRB ID range, the selected DRB ID information may be sent to a UE through an RRC reconfiguration message, or, the selected DRB ID information may be sent to a UE through the MN. In other words, in a case that the SN modification process is initiated by the SN, the SN may directly send the added DRB information in the RRC reconfiguration message to the UE, or may send the added DRB information to the UE through the MN.

Mode 2 differs from mode 1 in that the mode 2 does not require the DRB ID range to be acquired from the MN in advance. A DRB ID is acquired or directly added only when DRB modification is required.

When the SN executes the SN modification process (for example, when a DRB is added), an available DRB ID may be requested from the MN through an Xn request message. The MN may return an acknowledgment message through Xn. The SN may establish a DRB based on the message returned by the MN.

Specifically, for example, the first network node may be an SN, and the second network node may be an MN. The SN modification process may be initiated by the MN or may be initiated by the SN.

When a second network node initiates modification of the first network node, a modification request may be received from the second network node through an Xn interface, the modification request carrying DRB ID information used by the first network node. In other words, in a case that the SN modification process is initiated by the MN, the MN may send an SN modification request to the SN through Xn, the request message carrying DRB ID information. The SN may establish a DRB according to the information, and then feed back an establishment success message to the MN through Xn.

When the first network node initiates a modification process, a request message may be received from the first network node, DRB ID information used by the first network node may be determined, the DRB ID information may be added to a feedback message, and the feedback message may be sent to the first network node. In a case that the SN modification process is initiated by the SN, the SN may first send a request message to the MN, the MN may send an available DRB ID to the SN through a feedback message, and the SN may establish a DRB according to the available DRB ID in the feedback message.

By adopting the above solution, when a DRB is modified on a network side, a DRB ID can be selected within a stored DRB ID range, or a DRB ID can be acquired from a second network node. Thus, the second network node and a first network node can be coordinated to obtain final allocated DRB ID information, so as to avoid same DRB ID information from being allocated by both the first network node and the second network node when the first network node modifies the DRB independently, thereby avoiding mixing up DRB ID information.

Embodiment 3

Figure 2:
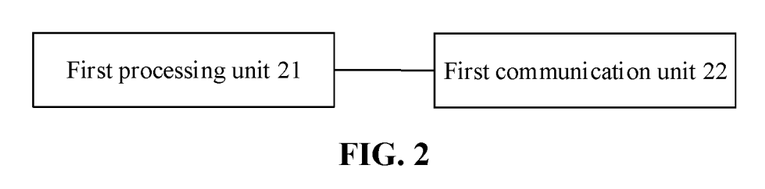
FIG. 2 is a schematic structure composition diagram of a first network node according to an embodiment of the disclosure.

An embodiment of the disclosure provides a first network node. As shown in FIG. 2, the first network node includes a first processing unit 21.

The first processing unit 21 may be configured to, in response to DRB modification, select DRB ID information within a stored DRB ID range, or, acquire DRB ID information from a second network node.

The first network node described in the embodiment may be an SN on a network side.

The embodiment may include the following two processing modes.

In mode 1, the first network node may further include a first communication unit 22.

The first communication unit 22 may be configured to receive an addition request of the first network node from the second network node.

The first processing unit 21 may be configured to acquire a DRB ID range of the first network node from the addition request of the first network node.

The operation that an addition request of the first network node is received from the second network node may include that: the addition request of the first network node is received from the second network node through an Xn interface.

Specifically, for example, the first network node may be an SN, and the second network node may be an MN.

When the SN is added by the MN, a DRB ID range available to the SN may be carried in a request message of adding the SN. The SN may be informed of that when a DRB is added, only IDs within the DRB ID range can be allocated to the added DRB.

The request message of adding the SN may be an Xn message initiated and transmitted by the MN to the SN through an Xn interface.

The DRB ID range of the SN may be configured to represent a minimum ID available to the SN. That is, the DRB ID range may indicate a minimum ID that can be used. For example, a total range is [0, 31]; if the DRB ID range included in the request message is 15, available DRB IDs of the SN may be [15, 31].

It should be understood that although not indicated, the DRB ID range may also indicate an available maximum value of the SN. For example, a total range is [0, 31]; if the DRB ID range is 15, it means that available DRB IDs of the SN is [0, 15].

There may also be other configuration modes. The embodiment will not list all of them.

The DRB addition of the SN may be initiated by the MN or may be initiated by the SN.

The first processing unit 21 may be further configured to: in response to initiation of modification of the first network node by the second network node, receive a modification request from the second network node through an Xn interface, select the DRB ID information within the DRB ID range based on the modification request, and use the selected DRB ID information as an added DRB. The first communication unit 22 may be further configured to send the added DRB to the second network node through an acknowledgment message. In other words, in a case that an SN modification process is initiated by the MN, the MN may send an SN modification request to the SN through Xn, and the SN may send the added DRB information (including type, ID, etc.) to the MN through an acknowledgment message.

The first processing unit 21 may be further configured to: in response to initiation of modification by the first network node, select the DRB ID information within the DRB ID range. The first communication unit 22 may be further configured to send the selected DRB ID information to UE through an RRC reconfiguration message, or, send the selected DRB ID information to UE through the second network node. In other words, if the SN modification process is initiated by the SN, the SN may directly send the added DRB information in the RRC reconfiguration message to the UE, or may send the added DRB information to the UE through the MN.

Mode 2 differs from mode 1 in that the mode 2 does not require the DRB ID range to be acquired from the MN in advance. A DRB ID is acquired or directly added only when DRB modification is required.

When the SN executes the SN modification process (for example, when a DRB is added), an available DRB ID may be requested from the MN through an Xn request message. The MN may return an acknowledgment message through Xn. The SN may establish a DRB based on the message returned by the MN.

The SN modification process may be initiated by the MN or may be initiated by the SN.

The first communication unit 22 may be further configured to feed back an establishment success message to the second network node. The first processing unit 21 may be further configured to receive, in response to initiation of modification of the first network node by the second network node, a modification request from the second network node through an Xn interface, acquire DRB ID information from the modification request, and establish a DRB based on the DRB ID information. In other words, in a case that the SN modification process is initiated by the MN, the MN may send an SN modification request to the SN through Xn, the request message carrying DRB ID information. The SN may establish a DRB according to the information, and then feed back an establishment success message to the MN through Xn.

The first communication unit 22 may be further configured to send, in response to initiation of modification by the first network node, a request message to the second network node, and receive a feedback message from the second network node in response to the request message. The first processing unit 21 may be further configured to acquire DRB ID information from the feedback message, and establish a DRB based on the DRB ID information. In a case that the SN modification process is initiated by the SN, the SN may first send a request message to the MN, the MN may send an available DRB ID to the SN through a feedback message, and the SN may establish a DRB according to the available DRB ID in the feedback message.

By adopting the above solution, when a DRB is modified on a network side, a DRB ID can be selected within a stored DRB ID range, or a DRB ID can be acquired from a second network node. Thus, the second network node and a first network node can be coordinated to obtain final allocated DRB ID information, so as to avoid same DRB ID information from being allocated by both the first network node and the second network node when the first network node modifies the DRB independently, thereby avoiding mixing up DRB ID information.

Embodiment 4

Figure 3:
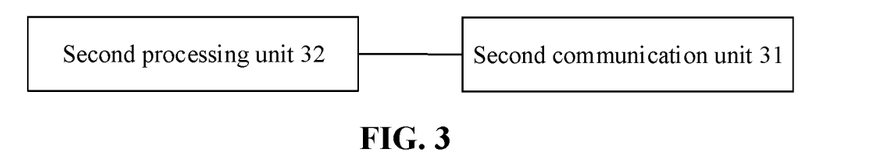
FIG. 3 is a schematic structure composition diagram of a second network node according to an embodiment of the disclosure.

An embodiment of the disclosure provides a second network node. As shown in FIG. 3, the second network node includes a second processing unit 31.

The second communication unit 31 may be configured to send, to a first network node, a DRB ID range of the first network node or DRB ID information used by the first network node.

In the present embodiment, for example, a second network node may be an MN on a network side.

The embodiment may include the following two processing modes.

In mode 1, the second network node may further include a second processing unit 32.

The second processing unit 32 may be configured to add a DRB ID range of the first network node to an addition request of the first network node.

The second communication unit 31 may be configured to send the addition request of the first network node to the first network node.

Further, when the first network node modifies a DRB, DRB ID information may be selected within a stored DRB ID range, or, DRB ID information may be acquired from the second network node.

Specifically, for example, the first network node may be an SN, and the second network node may be an MN.

When the SN is added by the MN, a DRB ID range available to the SN may be carried in a request message of adding the SN. The SN may be informed of that when a DRB is added, only IDs within the DRB ID range can be allocated to the added DRB.

The request message of adding the SN may be an Xn message initiated and transmitted by the MN to the SN through an Xn interface.

The DRB ID range of the SN may be configured to represent a minimum ID available to the SN. That is, the DRB ID range may indicate a minimum ID that can be used. For example, a total range is [0, 31]; if the DRB ID range included in the request message is 15, available DRB IDs of the SN may be [15, 31].

It should be understood that although not indicated, the DRB ID range may also indicate an available maximum value of the SN. For example, a total range is [0, 31]; if the DRB ID range is 15, it means that available DRB IDs of the SN is [0, 15].

There may also be other configuration modes. The embodiment will not list all of them.

Mode 2 differs from mode 1 in that the mode 2 does not require the DRB ID range to be acquired from the MN in advance. A DRB ID is acquired or directly added only when DRB modification is required.

When the SN executes the SN modification process (for example, when a DRB is added), an available DRB ID may be requested from the MN through an Xn request message. The MN may return an acknowledgment message through Xn. The SN may establish a DRB based on the message returned by the MN.

Specifically, for example, the first network node is an SN, and the second network node may be an MN. The SN modification process may be initiated by the MN or may be initiated by the SN.

The second processing unit 32 may be configured to add DRB ID information used by the first network node to a modification request. The second communication unit 31 may be configured to receive, in response to initiation of modification of the first network node by a second network node, a modification request from the second network node through an Xn interface. In other words, in a case that the SN modification process is initiated by the MN, the MN may send an SN modification request to the SN through Xn, the request message carrying DRB ID information. The SN may establish a DRB according to the information, and then feed back an establishment success message to the MN through Xn.

The second processing unit 32 may be configured to determine DRB ID information used by the first network node, and add the DRB ID information to a feedback message. The second communication unit 31 may be configured to receive, in response to initiation of modification by the first network node, a request message from the first network node, and send the feedback message to the first network node. In a case that the SN modification process is initiated by the SN, the SN may first send a request message to the MN, the MN may send an available DRB ID to the SN through a feedback message, and the SN may establish a DRB according to the available DRB ID in the feedback message.

By adopting the above solution, when a DRB is modified on a network side, a DRB ID can be selected within a stored DRB ID range, or a DRB ID can be acquired from a second network node. Thus, the second network node and a first network node can be coordinated to obtain final allocated DRB ID information, so as to avoid same DRB ID information from being allocated by both the first network node and the second network node when the first network node modifies the DRB independently, thereby avoiding mixing up DRB ID information.

Figure 4:
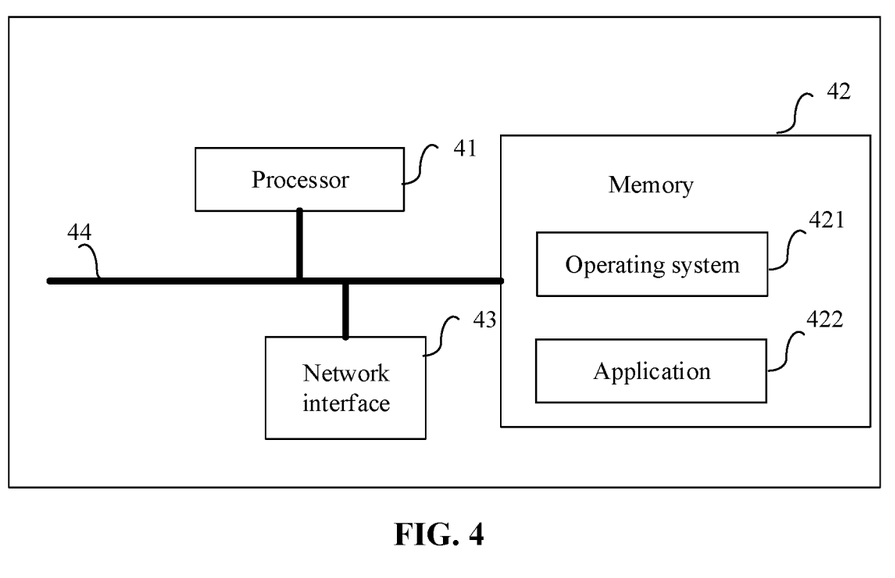
FIG. 4 is a schematic hardware architecture diagram according to an embodiment of the disclosure.

An embodiment of the disclosure further provides a hardware composition architecture of a first network node or a second network node. As shown in FIG. 4, the hardware composition architecture includes at least one processor 41, a memory 42, and at least one network interface 43. The various components may be coupled together via a bus system 44. It can be understood that the bus system 44 is configured to implement connection and communication among these components. The bus system 44 may include a data bus and also include a power bus, a control bus and a status signal bus. However, for the sake of clarity, various buses are labeled as the bus system 44 in FIG. 4.

It can be understood that the memory 42 in the embodiments of the disclosure may be a volatile memory or a non-volatile memory, or may include both the volatile memory and the non-volatile memory.

In some implementations, the memory 42 may store the following elements, executable modules or data structures, or their subsets, or their extensions, the following elements including:

an operating system 421 and an application 422.

The processor 41 is configured to be able to implement the method steps of Embodiment 1 or 2. The descriptions thereof are omitted herein.

An embodiment of the disclosure provides a computer storage medium. The computer storage medium may have computer executable instructions stored thereon that, when executed, implement the method steps of Embodiment 1 or 2.

When being implemented in the form of a software function module and sold or used as an independent product, the apparatus of the embodiments of the disclosure may also be stored in a computer-readable storage medium. Based on such an understanding, the technical solutions of the embodiments of the disclosure substantially or parts making contributions to the conventional art may be embodied in the form of a software product. The computer software product is stored in a storage medium, including a plurality of instructions configured to enable a computer device (which may be a personal computer, a server, a first device or the like) to execute all or part of the method in each embodiment of the disclosure. The foregoing storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, an embodiment of the disclosure also provides a computer storage medium which has a computer program stored thereon. The computer program is configured to perform a data scheduling method according to an embodiment of the disclosure.

Although the preferred embodiments of the disclosure have been disclosed for illustrative purposes, those skilled in the art will realize that various improvements, additions, and substitutions are also possible, and therefore, the scope of the disclosure should not be limited to the above-described embodiments.

The invention claimed is:

1. A method for allocating an identifier (ID) of a data radio bearer (DRB), comprising:
   receiving a DRB ID range available to the first network node from a second network node, wherein receiving the DRB ID range available to the first network node from the second network node comprises:
   receiving, in response to initiation of modification of the first network node by the second network node, a modification request from the second network node through an Xn interface, and selecting DRB ID information within the DRB ID range based on the modification request.

2. The method according to claim 1, wherein receiving the DRB ID range available to the first network node from the second network node further comprises:
   receiving an addition request of the first network node from the second network node, and
   acquiring the DRB ID range available to the first network node from the addition request of the first network node.

3. The method according to claim 2, wherein receiving the addition request of the first network node from the second network node comprises:
   receiving the addition request of the first network node from the second network node through an Xn interface.

4. A method for allocating an identifier (ID) of a data radio bearer (DRB), comprising:
   sending, to a first network node, a DRB ID range available to the first network node, wherein sending, to the first network node, the DRB ID range available to the first network node comprises:
   sending, in response to initiation of modification of the first network node by a second network node, a modification request to the first network node through an Xn interface, the modification request carrying DRB ID information used by the first network node.

5. The method according to claim 4, wherein sending, to the first network node, the DRB ID range available to the first network node comprises:
   sending an addition request of the first network node to the first network node, the addition request of the first network node being configured for the first network node to acquire the DRB ID range available to the first network node.

6. The method according to claim 5, wherein sending, to the first network node, the DRB ID range available to the first network node further comprises:
   adding the DRB ID range available to the first network node to the addition request of the first network node.

7. The method according to claim 5, wherein sending the addition request of the first network node to the first network node comprises:
   sending the addition request of the first network node to the first network node through an Xn interface.

8. The method according to claim 4, wherein the first network node is a secondary node, and the second network node is a master node.

9. A first network node, comprising:
a processor,
a memory, configured to store instructions executable by the processor, and
a network interface, connected to the processor and the memory and configured to perform communication under control of the processor;
wherein the network interface is configured to receive a DRB ID range available to the first network node from a second network node, wherein the processor is configured to control the network interface to receive, in response to initiation of modification of the first network node by the second network node, a modification request from the second network node through an Xn interface, and select DRB ID information within the DRB ID range based on the modification request.

10. The first network node according to claim 9, wherein the network interface is further configured to receive an addition request of the first network node from the second network node, and
the processor is configured to acquire the DRB ID range available to the first network node from the addition request of the first network node.

11. The first network node according to claim 10, wherein the network interface is further configured to receive the addition request of the first network node from the second network node through an Xn interface.

12. A second network node, comprising:
a processor,
a memory, configured to store instructions executable by the processor, and
a network interface, connected to the processor and the memory and configured to perform communication under control of the processor;
wherein the network interface is configured to send, to a first network node, a Data Radio Bearer (DRB) Identifier (ID) range available to the first network node, wherein
the processor is configured to add DRB ID information used by the first network node to a modification request, and
the network interface is configured to send, in response to initiation of modification of the first network node by the second network node, the modification request to the first network node through an Xn interface.

13. The second network node according to claim 12, wherein
the network interface is configured to send an addition request of the first network node to the first network node, the addition request of the first network node being configured for the first network node to acquire the DRB ID range available to the first network node.

14. The second network node according to claim 13, wherein the processor is configured to add the DRB ID range available to the first network node to the addition request of the first network node.

15. The second network node according to claim 13, wherein the network interface is configured to send the addition request of the first network node to the first network node through an Xn interface.

16. The second network node according to claim 12, wherein the first network node is a secondary node, and the second network node is a master node.

* * * * *